United States Patent
Reinkens

(10) Patent No.: US 8,432,065 B2
(45) Date of Patent: Apr. 30, 2013

(54) POWER SYSTEM HAVING DUAL SYNCHRONIZATION

(75) Inventor: Jens-Peter Reinkens, Holzdorf (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 349 days.

(21) Appl. No.: 12/738,589

(22) PCT Filed: Oct. 19, 2007

(86) PCT No.: PCT/US2007/022352
§ 371 (c)(1),
(2), (4) Date: Apr. 16, 2010

(87) PCT Pub. No.: WO2009/051585
PCT Pub. Date: Apr. 23, 2009

(65) Prior Publication Data
US 2010/0207457 A1    Aug. 19, 2010

(51) Int. Cl.
*H02J 3/00*       (2006.01)
(52) U.S. Cl.
USPC .............................................. 307/87; 307/84
(58) Field of Classification Search .................... 307/84, 307/87
See application file for complete search history.

(56) References Cited

U.S. PATENT DOCUMENTS

| 4,121,423 | A  | * | 10/1978 | Querry et al. ................... | 60/616 |
| 6,329,725 | B1 | * | 12/2001 | Woodall et al. ................. | 307/19 |
| 6,552,454 | B2 |   | 4/2003  | Kern et al. |  |

FOREIGN PATENT DOCUMENTS

| GB | 326857 |   | 3/1930 |
| JP | 1-194900 |   | 8/1989 |
| JP | 06245390 | * | 2/1994 |
| JP | 6-245390 |   | 9/1994 |
| JP | 2003-134897 |   | 5/2003 |
| RU | 2212356 C1 |   | 9/2003 |
| SU | 437173 A1 |   | 7/1974 |
| SU | 1539893 A1 |   | 1/1990 |
| WO | WO 2009/013155 A2 |   | 1/2009 |

OTHER PUBLICATIONS

International Search Report from the European Patent Office for International Application No. PCT/US2007/022352 (Jul. 30, 2008).

* cited by examiner

*Primary Examiner* — Hal Kaplan

(57) ABSTRACT

A power system for use in a power facility is disclosed. The power system may have a first generator set with a first engine drivingly coupled to a first generator, and a second generator set with a second engine drivingly coupled to a second generator. The power system may also have a common bus, and a controller in communication with the first and second generator sets. The controller may be configured to direct power from the first generator to the common bus, and synchronize a power output from the second generator with a power output from the first generator. The controller may be further configured to postpone power from the second generator being directed to the common bus until the first and second engines are substantially mechanically synchronized.

16 Claims, 3 Drawing Sheets

POWER SYSTEM HAVING DUAL SYNCHRONIZATION

TECHNICAL FIELD

The present disclosure relates generally to a power system and, more particularly, to a power system having dual synchronization.

BACKGROUND

Many power systems have multiple generator sets for supplying electricity to power loads. Often, these generator sets are connected to supply the power in parallel via a common bus. After one generator set is connected to the common bus, any additional generator sets connected to the bus should produce power matching the voltage, frequency, and phase angle of the power produced by the first generator set. This matching is also known as electrically synchronizing the generator sets. A better sync, results in a smoother transition and a lower shock on the generator and load.

When multiple generators are located near each other, as is the case in a common power plant or onboard a large marine vessel, vibrations from the various generator sets can travel through the mountings thereof and either dampen or amplify. Vibrations within the power plant or onboard the marine vessel can be excessive when the engines of the generator sets have odd numbers of cylinders. That is, an engine having an odd number of cylinders is mechanically unbalanced. For example, in a nine-cylinder engine, four pistons may be moving upward, while five pistons are moving downward. As a result of the unbalanced masses and their movements, there will be a greater resultant force in the downward direction of this example. Dependent on the weight and speed of such an engine, the size of the pistons, and the type of mounting (rigid or flexible), this force could be significant enough to transmit vibrations into the engine mounts and surrounding supports with enough amplitude that structural damage could occur and/or that the vibrations become a nuisance for the engine owner/operator. This is also a problem when multiple engines located near each other are operated in sync with each other (i.e., when eight pistons are moving upward and ten are moving downward, as would be the case with two closely operating nine-cylinder engines).

One system addressing the issue of synchronizing multiple generator sets is described in U.S. Pat. No. 6,552,454 (the '454 patent) issued to Kern et al. on Apr. 22, 2003. The '454 patent discloses a generator structure having first and second generator sets positioned within a common enclosure. Each generator set includes an engine and an alternator driven by the engine for generating electrical power. The first generator set produces electrical power of a first magnitude and frequency, and the second generator set produces electrical power of a second magnitude and frequency. The generator structure also includes a controller that monitors the magnitude and phase of the electrical power produced by the first and second generator sets, and adjusts the speed of the engines via an electronic governor such the power produced by the first and second generators is brought into alignment with each other, no phase difference between the associated sine waves exist, and so that the sine waves are at the same frequency. In addition, the system controller regulates the output voltages of the generator sets such that the output voltages are generally equal. Once the frequency and output voltages are synchronized, the system controller closes switches to connect the power from the first and second generator sets to a load.

Although the generator structure of the '454 patent may allow phase, frequency, and voltage matching, it does little to account for vibrations caused by imbalanced engines. And, because the generator sets are close-coupled in a common enclosure, depending on when the engines are electrically synchronized, it may be possible for the two generators to be electrically synchronized when the two associated engines are in phase with each other. And, if the engines are in phase enough and imbalanced, the vibrations could be severe enough to damage the common enclosure.

The power system of the present disclosure addresses one or more of the problems set forth above.

SUMMARY

In one aspect, the present disclosure is directed toward a power system. The power system may include a first generator set with a first engine drivingly coupled to a first generator, and a second generator set with a second engine drivingly coupled to a second generator. The power system may also include a common bus, and a controller in communication with the first and second generator sets. The controller may be configured to direct power from the first generator to the common bus, and synchronize a power output from the second generator with a power output from the first generator. The controller may be further configured to postpone power from the second generator being directed to the common bus until the first and second engines are substantially mechanically synchronized.

In another aspect, the present disclosure is directed toward a method of providing power. The method may include operating a first power source to produce electrical power, and directing power from the first power source to a common bus. The method may further include operating a second power source to produce electrical power, and synchronizing a power output from the second power source with a power output from the first power source. The method may additionally include postponing directing power from the second power source to the common bus until the first and second power sources are substantially mechanically synchronized.

DETAILED DESCRIPTION

Figure 1:
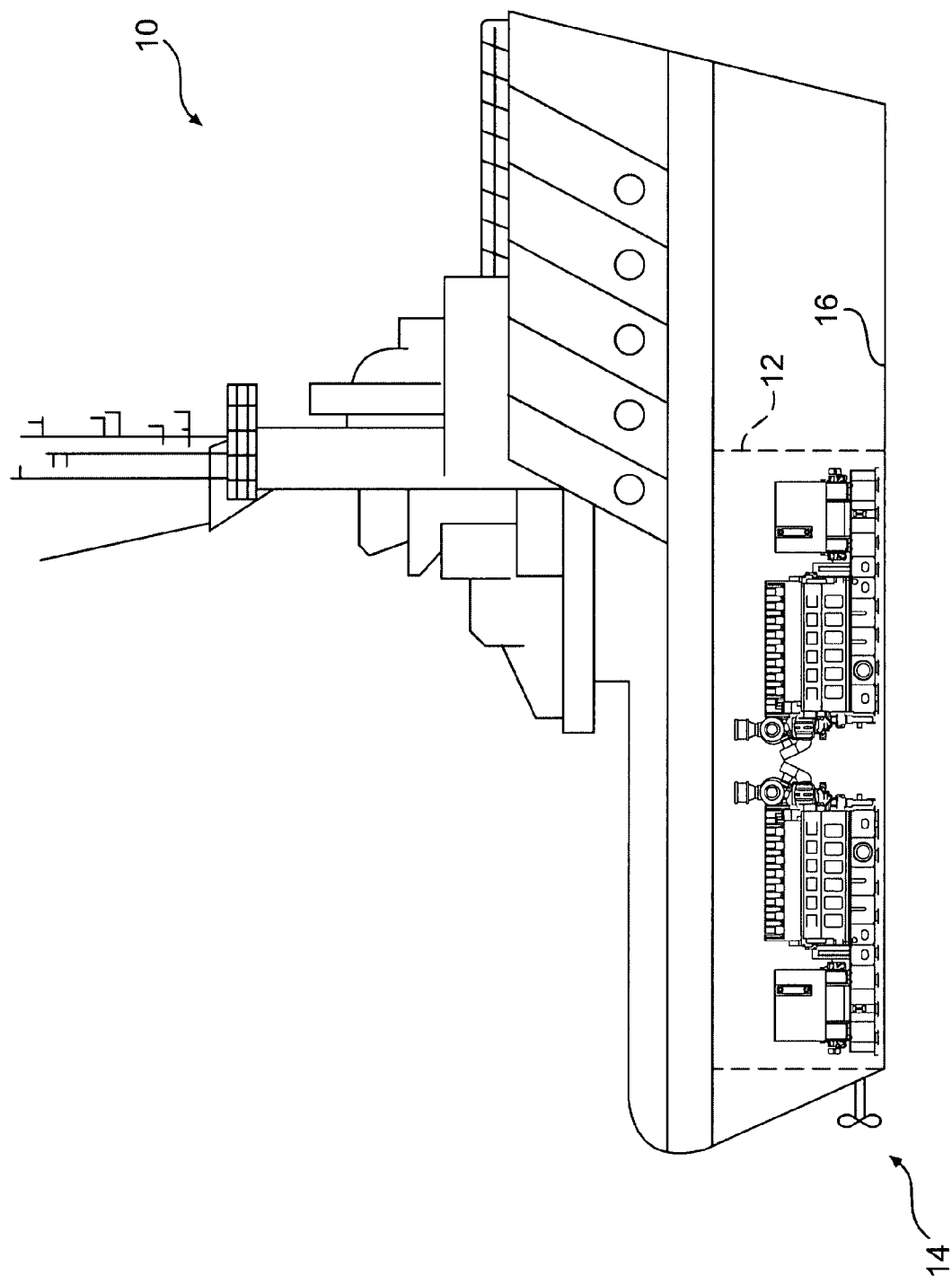
FIG. 1 is a pictorial illustration of one exemplary disclosed power facility

FIG. 1 illustrates a power facility 10 having a power system 12 configured to supply electricity to a power load 14. Although illustrated as a marine vessel in FIG. 1, power facility 10 may alternatively embody, for example, a stationary land-based power plant. Power facility 10 may include an anchor platform 16 such as a support frame connected to a hull of power facility 10, and to which power system 12 may be mounted. It is contemplated that power system 12 may be rigidly or flexibly mounted to anchor platform 16.

In the embodiment of FIG. 1, power load 14 may include any device or devices that require uninterrupted electricity to perform one or more tasks, including, but not limited, electric lights and electric drive motors associated with the depicted marine vessel. In some embodiments, power load 14 may require electric power in a particular form, such as three-phase alternating current.

Figure 2:
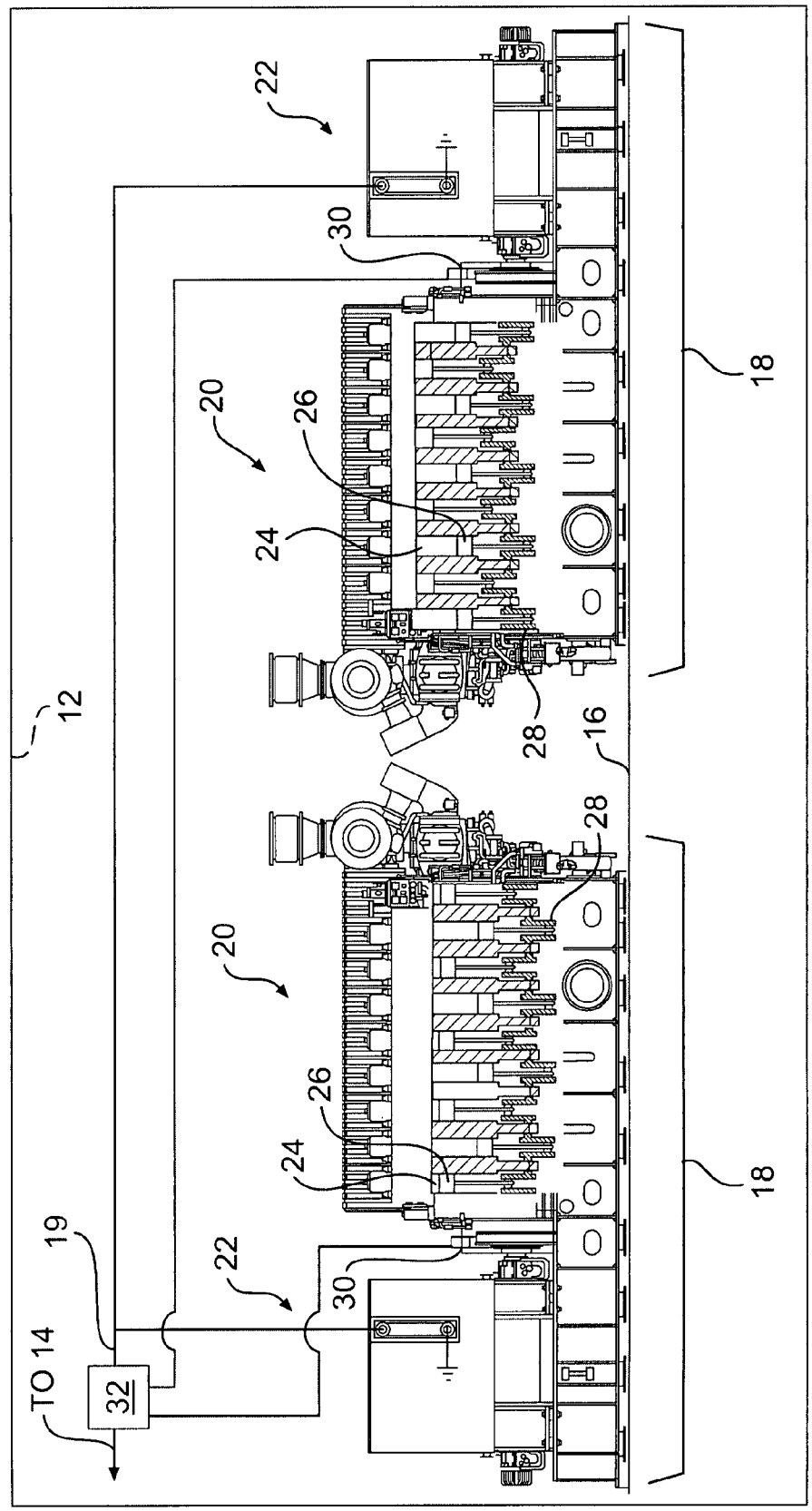
FIG. 2 is a cutaway view of an exemplary disclosed power system that may be used with the power facility of FIG. 1.

As illustrated in FIG. 2, power system 12 may include at least two closely-located power sources 18 operable to generate electricity, and a power-transmission network such as a common bus 19 for transferring electricity from power sources 18 to power load 14 (referring to FIG. 1). In one embodiment, each power source 18 may include an engine 20 drivingly coupled to a generator 22 to form a generator set. Although shown end-to-end, the generator sets may alternatively be located side-by-side or in a random arrangement within a common power room.

Each engine 20 may be any type of heat engine operable to produce mechanical power by combusting fuel, including, but not limited to, a diesel engine, a heavy fuel engine, a gasoline engine, and a gaseous-fuel-powered engine. In the illustrated embodiment, each engine 20 may be imbalanced. That is, each engine 20 may have an odd number of cylinders 24 resulting in a free mass or free mass moment. In one specific embodiment, engine 20 may include nine cylinders 24. With respect to the nine-cylinder example, four pistons 26 may connected to a common crankshaft 28 and be moving upward, while five piston 26 also connected to crankshaft 28 are moving downward. As a result of the unbalanced masses and their movements, there will be a greater resultant force in the downward direction of this example. This greater force is known as a free mass. If unaccounted for, the free mass can induce significant vibrations into anchor platform 16. And, when multiple engines 20 are proximally located and operating in phase with each other (i.e., crankshafts 28 of each engine 20 are oriented at about the same angle and rotating at about the same speed), the magnitude of the amplified vibrations may be excessive.

A sensor 30 may be associated with each engine 20 to detect an instantaneous position of each crankshaft 28. In one embodiment, sensor 30 may embody, for example, an impulse transmitter configured to generate a pulse signal each time crankshaft 28 passes through a particular angle. For example, when crankshaft 28 of one engine 20 rotates the majority of pistons 26 to pass through a top dead center (TDC) position, the associated impulse transmitter may generate a first electronic pulse. Similarly, when crankshaft 28 of a second engine 20 rotates the majority of pistons 26 to pass through a bottom dead center (BDC) position, the associated impulse transmitter may generate a second electronic pulse. In this example, when the first and second electronic pulses are generated at about the same time, the engines may be about 180° out of phase and the resulting vibrations may substantially dampen or even cancel each other completely. In contrast, a greater time between the first and second pulses may correspond with engines 20 that are substantially in phase with each other and the resulting vibrations may be additive. It is contemplated that sensor 30 may alternatively be associated with generators 22, for example with rotors that are directly driven by engine 20, and/or with windings of generators 22.

Each generator 22 may be any type of power producing device mechanically coupled to receive power from engine 20 and convert at least a portion of that mechanical power into electricity. For example, each generator 22 may embody an AC induction generator, a permanent-magnet generator, an AC synchronous generator, or a switched-reluctance generator. In one embodiment, each generator 22 may include seven pairings of poles (not shown), each pairing having three phases arranged on a circumference of a stator (not shown) to produce an alternating current with a frequency of 60 Hz.

Power system 12 may also include a synchronizing and load sharing controller 32 to regulate operation of power system 12. Controller 32 may include commonly known components that cooperate to synchronize the electrical output of multiple power sources 18 and combine the output into a common supply of power directed to load 14 (referring to FIG. 1). For example, controller 32 may include, among other things, one or more breakers (not shown) connected between each generator 22 and common bus 19 and/or between common bus 19 and power load 14 to selective connect the electrical output from one or both generators 22 to common bus 19 and/or to selectively connect common bus 19 to power load 14. In addition, controller 32 may be in communication with each engine 20, each generator 22, and sensors 30 to monitor and/or control one or more aspects of generator set operation. Controller 32 may further include one or more sensing devices (not shown) to receive input regarding characteristics of electricity generated by each power source 18 such as the current, frequency, phase, and/or voltage. Additionally, controller 32 may receive information relating to the amount of power required by power load 14. For example, controller 32 may receive information such as the voltage and/or current along one or more portions of common bus 19, and the voltage and/or current in one or more components of power load 14.

Closing a first breaker associated with a first one of generators 22 may electrically connect the output of that generator 22 to common bus 19. To electrically connect an additional generator 22 to common bus 19, it may be required that the output of the additional generator 22 have a voltage, frequency, and phase angle that substantially matches the voltage, frequency, and phase angle of the first connected generator 22. A better match may result in a smoother transition and a lower shock on power load 14. Controller 32 may regulate operation of the additional power source 18 (i.e., engine 20 and/or generator 22) to vary the electrical output characteristics of the produced power and match the electrical output characteristics of the first generator 22. Once all synchronization conditions (i.e., frequency, phase angle, and voltage) have been met, a breaker close command may be issued by controller 32 to the breaker associated with the second generator 22 and, after a brief actuation delay, the breaker may close.

Controller 32, in addition to synchronizing the power outputs of multiple generators 22, may also control mechanical synchronization of the engines 20 driving those generators 22. Specifically, after electrical synchronization and before controller 32 issues the breaker close command in an attempt to bring additional generators 22 online, controller 32 may first check via sensors 30 to see if the associated first and additional engines 20 are operating in phase with each other (i.e., if the majority of pistons 26 from one engine 20 are moving to TDC at about the same time as the majority of pistons 26 from the second engine 20). If the associated engines 20 are operating sufficiently out of phase with each, controller 32 may go ahead and issue the breaker close command. However, if the associated engines 20 are operating insufficiently out of phase, controller 32 may postpone bringing the additional generators 22 online and abort the current synchronization attempt. Controller 32 may initiate another synchronization attempt and repeat the same synchronization cycle a number of times. In one embodiment, controller 32 may attempt dual synchronization (electrical and mechanical) up to ten times before initiating a backup strategy. During the backup strategy, controller 32 may issue the breaker close command regardless of mechanical synchronization. In this manner, load 14 may experience only a minor delay in power supply when mechanical synchronization is unsuccessful.

Figure 3:
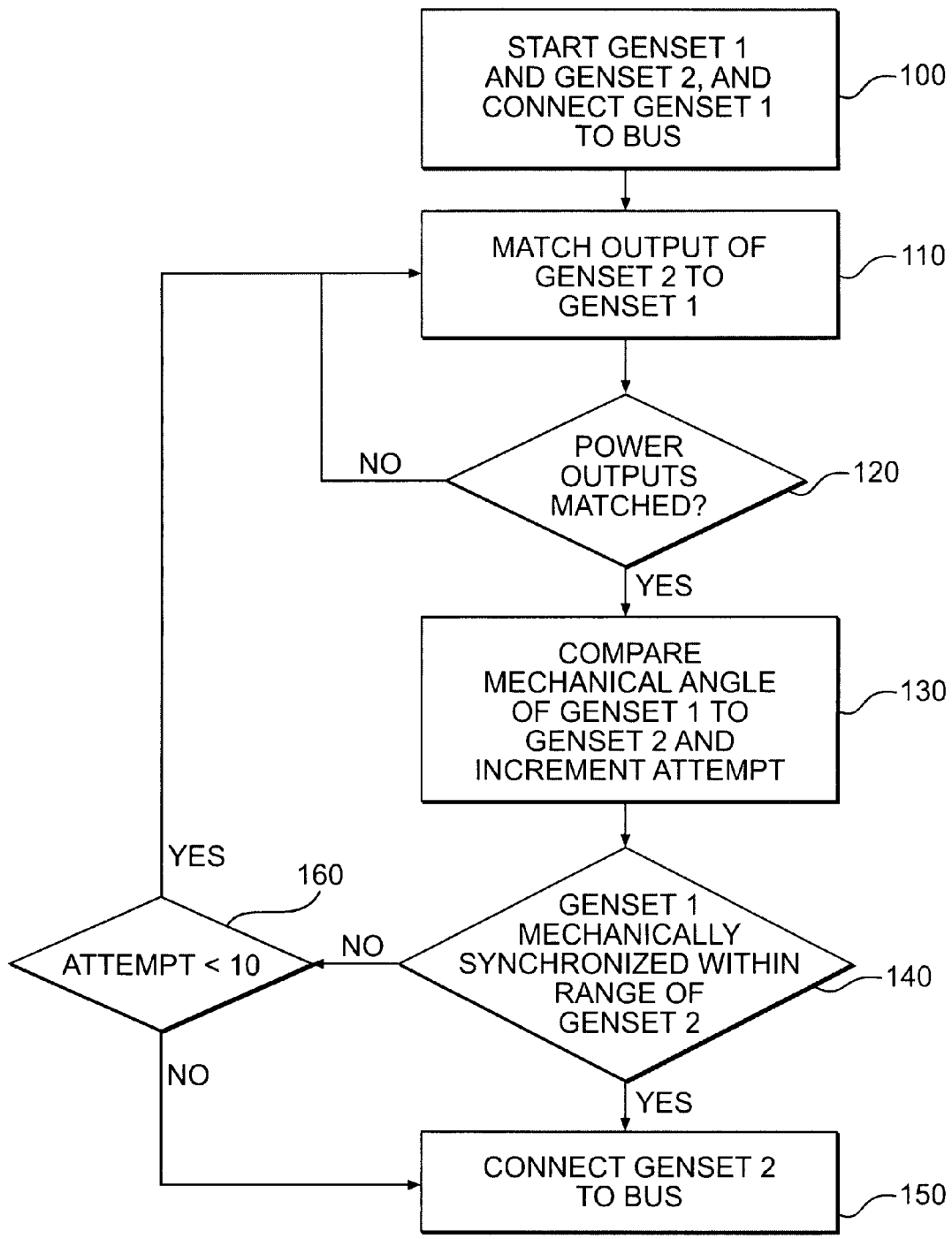
FIG. 3 is a flow chart depicting an exemplary disclosed operation associated with the power system of FIG. 2.

FIG. 3 is a flow chart depicting an exemplary operation of power system 12. FIG. 3 will be discussed in the following section to further illustrate the disclosed system and its operation.

INDUSTRIAL APPLICABILITY

The disclosed power system may have application wherever electrical and mechanical balancing is desired, for example, when multiple power sources having imbalanced moving masses are proximally located. During operation of the disclosed power system, electrical and mechanical synchronizing (i.e., dual synchronizing) may be performed to produce a common electrical power supply and to simultaneously dampen vibrations associated with the power sources. Operation of power system 12 will now be described.

To initiate operation of power system 12, each power source 18 may be started, and power from one source 18 may be directed to common bus 19 (Step 100). To start each power source 18, the associated engine 20 may be brought up to speed to drive the connected generators 22. In some situations, bringing engine 20 up to speed may include cranking to initiate combustion. In other situations, engine 20 may already be operating, but at only a standby level. Once the output a first of engines 20 is brought up to speed and the connected generator 22 is producing power at a level demanded by load 14, controller 32 may issue a breaker close command to electrically connect the output of that generator 22 to common bus 19. Although additional generators 22 may also be producing power at the level demanded by load 14, they may remain isolated from common bus 19 until the power output from the additional generators 22 substantially match the power output of the first connected generator 22.

Controller 32 may match the power output from additional generators 22 to that of the first connected generator 22 before additional connections to common bus 19 may be made (Step 110). Controller 32 may regulate operational characteristics of the additional engines 20 and/or generators 22 to vary and substantially match frequencies, phase angles, and voltages. Once controller 32 determines that the power output of any additional generators 22 substantially match the power output of the first connected generator 22 (Step 120), controller 32 may check the mechanical synchronization between engines 20. That is, controller 32 may compare the mechanical phase angle of the engine 20 associated with the first connected generator 22 with the mechanical phase angle of the remaining engines 20 via sensors 30 (Step 130). If controller 32 determines that the mechanical phase angle of the remaining engines 20 are synchronized within an acceptable range of the engine 20 driving the first connected generator (Step 140), controller 32 may issue additional breaker close commands to connect the remaining generators 22 to common bus 19 (Step 150). In one embodiment, the acceptable range is 170-190°.

If controller 32 determines that the mechanical phase angle of the remaining engines are not synchronized within the acceptable range, controller 32 may abort the current synchronizing attempt and determine the number of attempts made thus far in the process (Step 160). If the number of attempts is less than an acceptable number, for example ten attempts, the process may be restarted by returning control to step 110. However, if the acceptable number of attempts has been made, controller 32 may, instead, connect the electrical output from the additional generators 22 to common bus 19 regardless of mechanical synchronization (Step 150). In this manner, when mechanical synchronization is not possible or has been unsuccessful, power supply delays associated with an excessive number of attempts may be minimized.

It will be apparent to those skilled in the art that various modifications and variations can be made in the disclosed power system and method without departing from the scope of the disclosure. Other embodiments of the disclosed power system will be apparent to those skilled in the art from consideration of the specification and practice of the power system and methods disclosed herein. For example, although power system 12 has been described primarily with respect to only two generator sets, it is contemplated that controller 32 may also control both electrical and mechanical synchronization of more than two generator sets. It should be noted, however, that if more that two generator sets are to mechanically synchronized, the out-of-phase angle would be different than disclosed above (i.e., different than 180°) and a function of the number of engines requiring mechanical synchronization. Further, although intended primarily for imbalanced engines (i.e., engines having an odd number of cylinders resulting in a free mass), the dual synchronization of the current disclosure may be applied just as easily to an engine having an even number of cylinders but still experiencing excessive vibrations. In one specific embodiment, engine 20 may include nine cylinders 24. It is intended that the specification and examples be considered as exemplary only, with a true scope of the disclosure being indicated by the following claims and their equivalents.

What is claimed is:

1. A power system, comprising:
   a first generator set having a first engine drivingly coupled to a first generator;
   a second generator set having a second engine drivingly coupled to a second generator;
   a common bus; and
   a controller in communication with the first and second generator sets, the controller being configured to:
   direct power from the first generator to the common bus;
   synchronize a power output from the second generator with a power output from the first generator;
   attempt mechanical synchronization a number of times;
   direct power from the second generator to the common bus if the first and second engines are substantially mechanically synchronized during the number of attempts; and
   direct power from the second generator to the common bus after power output synchronization regardless of mechanical synchronization when the number of attempts has been made.

2. The power system of claim 1, wherein the power output from the second generator is synchronized with the power output from the first generator when at least one of a phase angle, a frequency, and a voltage of the power outputs from the first and second generators are substantially matched.

3. The power system of claim 1, further including:
   a first sensor situated to generate a first signal indicative of a rotational angle of the first engine; and
   a second sensor situated to generate a second signal indicative of a rotational angle of the second engine,
   wherein the controller is configured to compare the first and second signals after synchronizing the power output of the second generator with the power output of the first generator.

4. The power system of claim 3, wherein the controller is configured to direct power from the second generator to the common bus only when the rotational angles of the first and second engines are within 170-190° out of phase with each other.

5. The power system of claim 4, wherein the controller is configured to direct power from the second generator to the common bus only when the rotational angles of the first and second engines are about 180° out of phase with each other.

6. The power system of claim 1, wherein the number of attempts is ten.

7. The power system of claim 1, wherein at least one of the first and second engines has an imbalanced rotational mass.

8. The power system of claim 7, wherein the imbalanced rotational mass is caused by the at least one of the first and second engines having an odd number of cylinders.

9. The power system of claim 8, wherein the first and second engines are substantially identical and include nine cylinders each.

10. The power system of claim 1, wherein the first and second engines are mounted to a common anchor platform.

11. A method of providing power, comprising:
operating a first power source to produce electrical power;
directing power from the first power source to a common bus;
operating a second power source to produce electrical power;
synchronizing a power output from the second power source with a power output from the first power source;
attempting mechanical synchronization a number of times;
directing power from the second power source to the common bus if the first and second power sources are substantially mechanically synchronized during the number of attempts; and
directing power from the second power source to the common bus after power output synchronization regardless of mechanical synchronization when the number of attempts has been made.

12. The method of claim 11, wherein the power output from the second power source is synchronized with the power output from the first power source when a phase angle, a frequency, and a voltage of the power outputs from the first and second power sources are substantially matched.

13. The method of claim 11, further including:
sensing a first rotational angle of the first power source;
sensing a second rotational angle of the second power source; and
comparing the first and second rotational angles after synchronizing the power output of the second power source with the power output of the first power source.

14. The method of claim 13, further including directing power from the second power source to the common bus only when the rotational angles of the first and second power sources are about 180 degrees out of phase with each other.

15. The method of claim 13, wherein the number of attempts is ten.

16. A power facility, comprising:
a common anchor platform;
a first generator set mounted to the common anchor platform and having a first mass-imbalanced engine drivingly coupled to a first generator;
a second generator set mounted to the common anchor platform in proximity to the first generator set and having a second mass-imbalanced engine drivingly coupled to a second generator;
a common bus configured to transmit electrical power from the first and second generator sets to a power load; and
a controller in communication with the first and second generator sets, the controller being configured to:
direct power from the first generator to the common bus;
synchronize a power output from the second generator with a power output from the first generator;
attempt mechanical synchronization a number of times;
direct power from the second generator to the common bus if the first and second mass-imbalanced engines are substantially mechanically synchronized; and a vibrational input directed from the first generator set into the common anchor platform is at least partially dampened by a vibrational input from the second generator set during the number of attempts; and
direct power from the second generator to the common bus after power output synchronization regardless of mechanical synchronization when the number of attempts has been made.

\* \* \* \* \*